(12) United States Patent
Doole

(10) Patent No.: US 8,083,454 B2
(45) Date of Patent: Dec. 27, 2011

(54) CONNECTORS FOR TIMBER

(75) Inventor: Kevin Graham Doole, Hamilton (AU)

(73) Assignee: Superior IP International Pty Ltd., Hamilton, Queensland (AU)

( * ) Notice: Subject to any disclaimer, the term of this patent is extended or adjusted under 35 U.S.C. 154(b) by 627 days.

(21) Appl. No.: 11/660,706

(22) PCT Filed: Aug. 19, 2005

(86) PCT No.: PCT/AU2005/001249
§ 371 (c)(1),
(2), (4) Date: Nov. 5, 2008

(87) PCT Pub. No.: WO2006/017908
PCT Pub. Date: Feb. 23, 2006

(65) Prior Publication Data
US 2009/0087281 A1 Apr. 2, 2009

(30) Foreign Application Priority Data
Aug. 19, 2004 (AU) .................... 2004904719

(51) Int. Cl.
*F16B 15/00* (2006.01)
(52) U.S. Cl. ...................... 411/471; 411/921
(58) Field of Classification Search .......... 411/457, 411/471, 921; 52/745.21
See application file for complete search history.

(56) References Cited

U.S. PATENT DOCUMENTS

| 66,968 | A | * | 7/1867 | Kendig | 402/14 |
|---|---|---|---|---|---|
| 278,263 | A | * | 5/1883 | Orr | 52/682 |
| 793,431 | A | * | 6/1905 | Fleischer | 411/460 |
| 1,310,908 | A | * | 7/1919 | Gilbert | 411/471 |
| 1,734,410 | A | | 11/1929 | Wells | |
| 2,111,404 | A | * | 3/1938 | Pankonin | 411/444 |
| 2,132,295 | A | * | 10/1938 | Hawkins | 411/473 |
| 2,153,874 | A | * | 4/1939 | Posnack | 29/432.1 |
| 2,236,581 | A | * | 4/1941 | Schenck | 411/457 |
| 3,960,147 | A | * | 6/1976 | Murray | 606/75 |
| 4,340,331 | A | * | 7/1982 | Savino | 411/457 |
| 5,053,038 | A | * | 10/1991 | Sheehan | 606/75 |
| 5,846,019 | A | * | 12/1998 | Kuhns | 403/282 |

FOREIGN PATENT DOCUMENTS

| AU | 46317/72 B | 3/1974 |
|---|---|---|
| FR | 0717308 | 1/1932 |
| FR | 1016865 | 11/1952 |
| RU | 2069801 C | 11/1996 |

OTHER PUBLICATIONS

International Search Report mailed Sep. 30, 2005 for PCT/AU2005/001249.

* cited by examiner

*Primary Examiner* — Flemming Saether
(74) *Attorney, Agent, or Firm* — Michael J. Feigin, Esq.; Feigin & Associates, LLC

(57) ABSTRACT

A U-shaped connector (10) for connecting together abutting or adjoining timber elements includes a stem portion extending between two kinked spike portions (14,16) with each spike portion (14,16) extending in a common direction from the stem portion. Each kinked spike portion (14,16) is comprised of four straight portions (15,18,20,22 and 17,19,21,23) of equal length joined end-to-end, with each straight portion extending at an angle to its adjacent portion. Distal ends (24,25) of each tip portion (22,23) are sharpened and splayed wider than the stem portion. On installation, the flexibility of connector (10) is sufficient to provide a compressive force to the abutting faces of the timbers being joined with the kinked spike portions (14,16) moving outwards away from each other so as to increase the connector's pull out resistance.

12 Claims, 8 Drawing Sheets

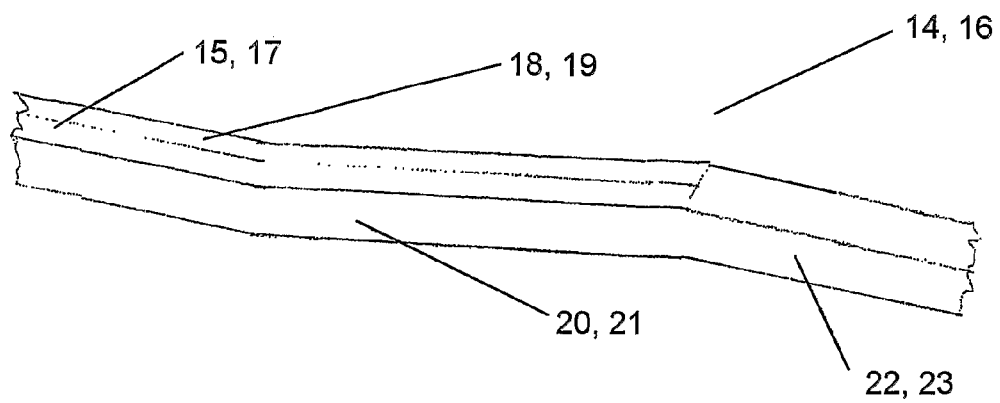
Fig. 5
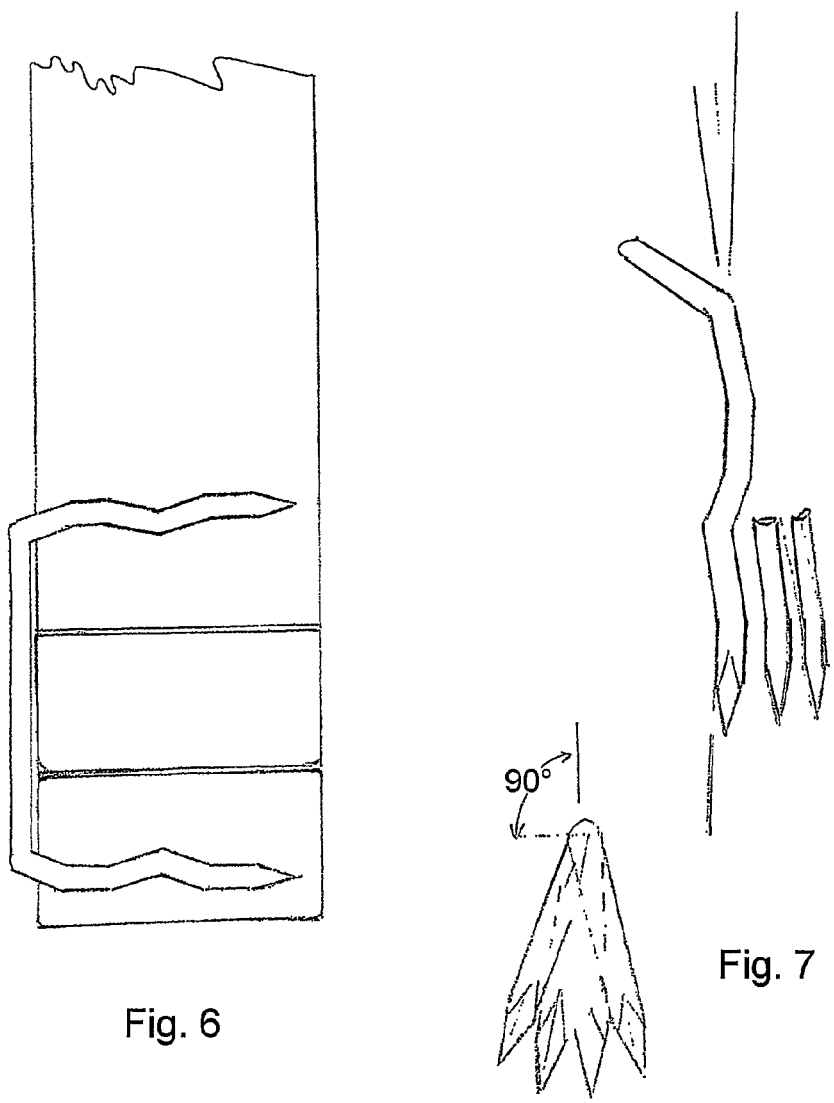
Fig. 6
Fig. 7

CONNECTORS FOR TIMBER

FIELD OF INVENTION

THIS INVENTION relates to improved connectors for connecting together abutting or adjoining timber elements. The invention is primarily directed to improvements in the connectors for connecting two timber elements to one another as disclosed in my previous Australian Patent Application No. 200155937 (hereinafter referred to as "my earlier patent application"), the specification of which is incorporated herein by reference. However, the invention is not limited to this field of use.

BACKGROUND ART

Timber elements may be joined together by a skew nail penetrating the members to be joined, by plate or gang nail connectors, or by bent nail arrangements. For timber trusses, gang nails predominate as the connector of choice. For joining one timber element at right angles to another, such as studs to top and bottom plates of wall frames, skewed nails are often used. A stronger joint may be effected by using a bent nail I developed, and which is disclosed in Australian Patent No. 628834. However, there are shortcomings in these earlier connectors. One such shortcoming is that when not being used, such nails create a safety problem is left on the ground or floor because their natural orientation leaves a spike projecting in a substantially upward direction.

Although skew nails are very quick to insert, the strength of the joint is dependant, to a considerable extent, on the skill of the person making the joint. Moreover, skew-nailed joints do not provide a high resistance to separation of the joined elements because the nails themselves do not have a high resistance to withdrawal from the timber elements, even when such nails are inserted at an optimum angle or with optimum effect.

Gang nail plates usually provide a stronger joint than straight or skewed nail joints, but still do not provide a high resistance to separation of the joined elements. Additionally, gang nails are difficult to install by hand, being prone to bending of the plate or flattening of one or more of the pins or spikes unless installed by a hydraulic press or the like.

The bent nail disclosed in Australian Patent No. 628834 provides a superior strength joint. Refinements to that nail have been shown to provide excellent joint strength for cyclone applications. However, that nail is difficult to install by hand and requires a specially developed nail gun to be installed automatically.

After seeking to refine the nail disclosed in my earlier patent application, it has been surprisingly found that a new range of parameters provides superior results to all of the abovementioned connectors. Since the filing of my Australian Provisional Patent Application No. 2003904358, it has been discovered that without careful selection of appropriate parameters for such nails, the timber joints cannot flex to an optimum amount, affording such joints greater efficacy and less tendency to failure in temporary high load situations such as subjecting structures to cyclonic wind storms. Additionally, in prior art nails, timber can sometime be more prone to splitting.

The present invention aims to provide connectors for timber which are an improvement, on the timber connectors of the prior art. It is also an aim of the invention to provide improved timber connectors which alleviate one or more of the disadvantages of prior art connectors. Other aims and advantages of the invention may become apparent from the following description.

DISCLOSURE OF THE INVENTION

With the foregoing in view, this invention resides broadly in a connector for connecting together abutting or adjoining timber elements, including:
a stem portion extending between two spike portions, each spike portion extending from a respective end of the stem portion generally in a common direction from the stem portion to form a generally U-shaped connector such that the stem portion has a stem axis extending straight between each end, each spike having four substantially straight portions of approximately equal length extending from one another end-to-end as follows:
   an inner portion adjoining the stem portion and extending from each end thereof at an inside angle in the range of 95° to 100"- to the axis of the stem portion;
   a proximal skew portion adjoining and extending from the inner portion at an inside angle in the range of 36° to 65° to the axis of the stem portion;
   a distal skew portion adjoining and extending from the proximal skew portion at an inside angle of 115° to 142° to the axis of the stem portion;
   a tip portion adjoining and extending from the distal skew portion at an inside angle substantially at 90° to the axis of the stem portion,
   such that the axes of each portion lie substantially in one plane and the axes of the tip portions intersect the axis of the stem portion remote from the ends of the stem portion, the distal end of each tip portion being sharpened.

Preferably, the inner, proximal, distal and tip portions of each spike are disposed at substantially the same angles to the stem axis as one another. The stem portion may be substantially straight for applications where the faces of the timber elements being joined are substantially in alignment with one another. Alternatively, where the timber elements are to be joined angularly to one another, it is preferred that the stem portion is configured to conform substantially to the faces of the timber against which the stem portion would lie (or be partially or fully embedded into) when the spikes have been substantially fully inserted into the respective timber elements. In such form, it will be appreciated that the stem portion itself may diverge significantly from the stem axis hereinbefore described.

In a further adaptation of the invention, two or more connectors according to the invention may be integrated with one another by joining two or more stem portions together intermediate their respective ends such that the spikes are aligned generally in the same direction. In one example of the invention of such form, the stems of two connectors according to the invention may be entwined with one another or twisted together. In such form, the portions of each spike are aligned to occupy either a single plane or substantially parallel planes.

In another aspect, the present invention resides broadly in a method of connecting timbers including:
   providing a connector for connecting together abutting or adjoining timber elements, the connector having a stem portion extending between two spike portions, each spike portion extending from a respective end of the stem portion generally in a common direction from the stem portion to form a generally U-shaped connector such that the stem portion has a stem axis extending straight between each end, each spike having four-substantially straight portions of approximately equal length extending from one another end-to-end comprising firstly an inner portion adjoining the stem portion and extending from each end thereof at an inner inside angle to the axis of the stem portion, secondly a proximal skew portion adjoining and extending from the inner portion at a proximal skew portion angle to the axis of the stem portion, thirdly a distal skew portion adjoining and extending from the proximal skew portion at distal skew portion angle to the axis of the stem portion and fourthly a tip portion adjoining and extending from the distal skew portion at tip angle to the axis of the stem portion, the distal end of tip portion being sharpened and the axes of each portion of the spikes lying substantially in one plane and the angles being selected such that axes of the tip portions intersect the axis of the stem portion remote from the ends of the stem portion, and inserting the connector into timber thereby causing flexing of the spikes with respect to the stem to a degree sufficient to impart tension to the stem.

BRIEF DESCRIPTION OF THE DRAWINGS

In order that the invention may be more readily understood and put into practical, effect, reference will now be made to the accompanying drawing which illustrates preferred embodiments of the invention in several forms and wherein:—

FIG. 5 is a diagrammatic pictorial view of part of a spike of the connector of FIGS. 1 and 2;

FIG. 6 is a diagrammatic side view of the connector of FIGS. 1 and 2 inserted into a ribbon plate and stud;

FIG. 7 is a diagrammatic pictorial view of the connectors of FIG. 1 or FIG. 2 showing torsional variation of one of the spikes in relation to the other;

DETAILED DESCRIPTION OF THE DRAWINGS

Figure 1:
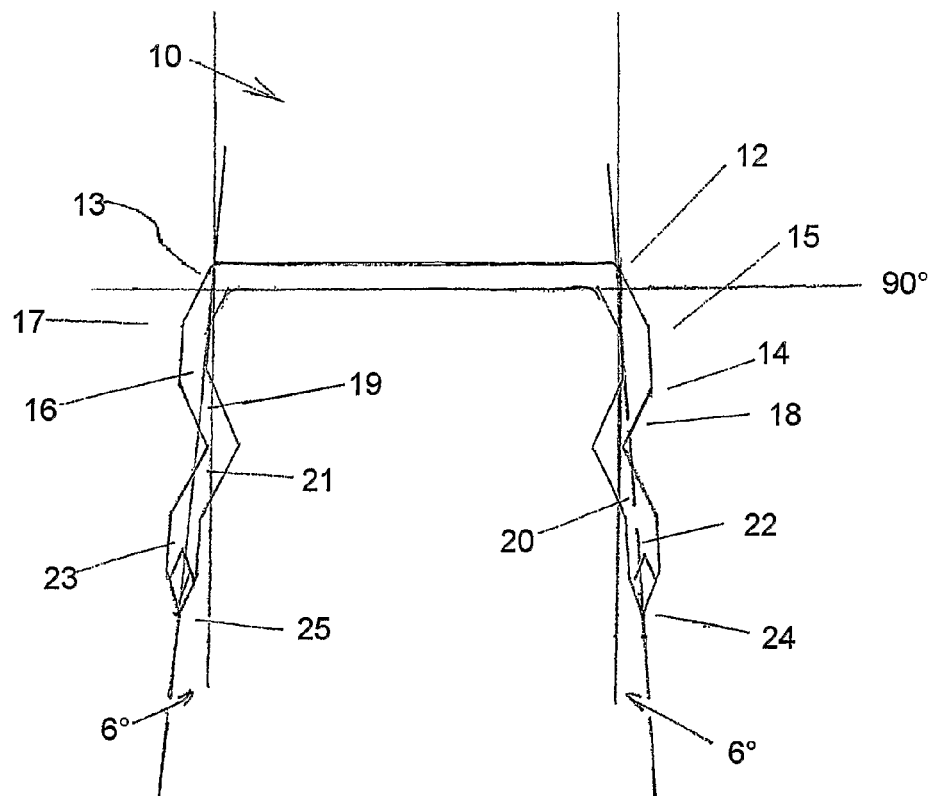
FIG. 1 is a diagrammatic side view of a connector according to the invention.
Figure 2:
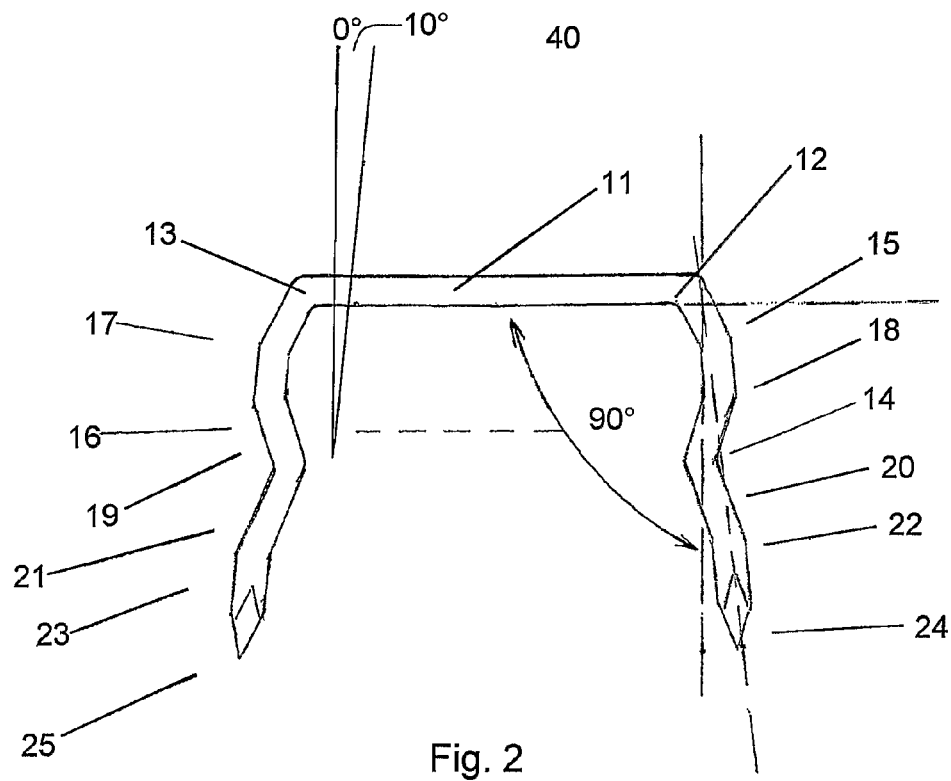
FIG. 2 is a diagrammatic side view of the connector of FIG. 1 under tension when installed into timber.
Figure 3:
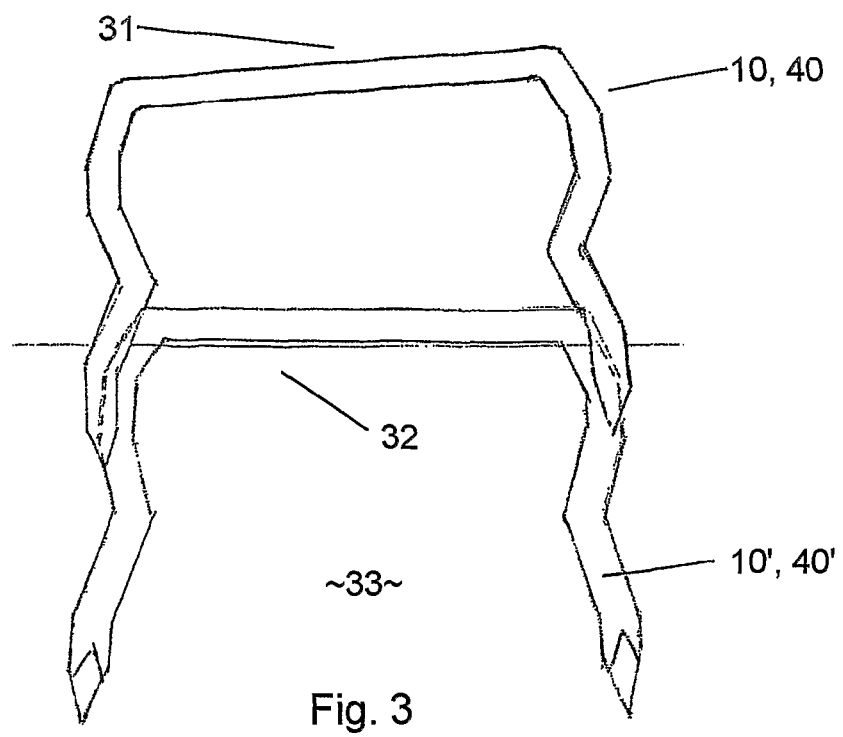
FIG. 3 is a diagrammatic schematic representation of the insertion of the connectors of FIGS. 1 and 2 into timber.

The connector 10 shown in FIGS. 1 to 3 has a substantially straight stem portion 11 extending between respective ends. For convenience, each end will be referred to respectively as a right hand end 12 and a left hand end 13, but it will be appreciated that the use of such terms is not to be taken as limiting the invention to use in any particular orientation. Extending from the right hand end is a right spike 14 and extending from the left end 13 is a left spike 16, each spike depending downward from the stem portion at an angle which is generally close to, but not exactly 90°. The connector shown in FIG. 1 is not under tension, whereas, after insertion into timber, the connector of FIG. 1 flexes to the form shown in FIG. 2, which is thus under tension.

The right spike includes an inner portion 15, a proximal skew portion 18 extending from the inner portion, a distal skew portion 20 extending from the proximal skew portion and an end portion 22 extending from the proximal skew portion and ending in a sharpened tip 24. Extending in generally the same direction, the left spike includes an inner portion 17 extending from the left end, a proximal skew portion 19 extending from the inner portion, a distal skew portion 21 extending from the proximal skew portion, an end portion 23 extending from the distal skew portion and ending in a sharpened tip 25. Both of the spikes are substantially the same configuration, but oriented in reverse or mirror image to one another in terms of their form, the skew portions being generally being directed towards one another as shown. The inner and end portions are at an angle of 6° off right angles to the axis of the stem portion and the skew portions are cranked a further 5° to 10° from right angles to the axis of the stem portion. The arrangement of the angles of this skew portion and the length of each portion are selected such that the tip is outside a line extending at 90° to the stem axis to intercept therewith at the end of the stem portion.

The connector when tensioned as shown in FIG. 2 has the same parts with the same reference numerals as the connector shown in FIG. 1, but with the different elements making up the connector being at different selected angles to one another, and more particularly at different alignment to the axis of the stem portion. As shown in FIG. 3, the connector is first partly inserted at 31 and fully inserted at 32 into a timber element 33. Although normally both spikes are inserted at the same time, it can be seen that one spike may be partly inserted more than the other until the connector is fully inserted.

Figure 4:
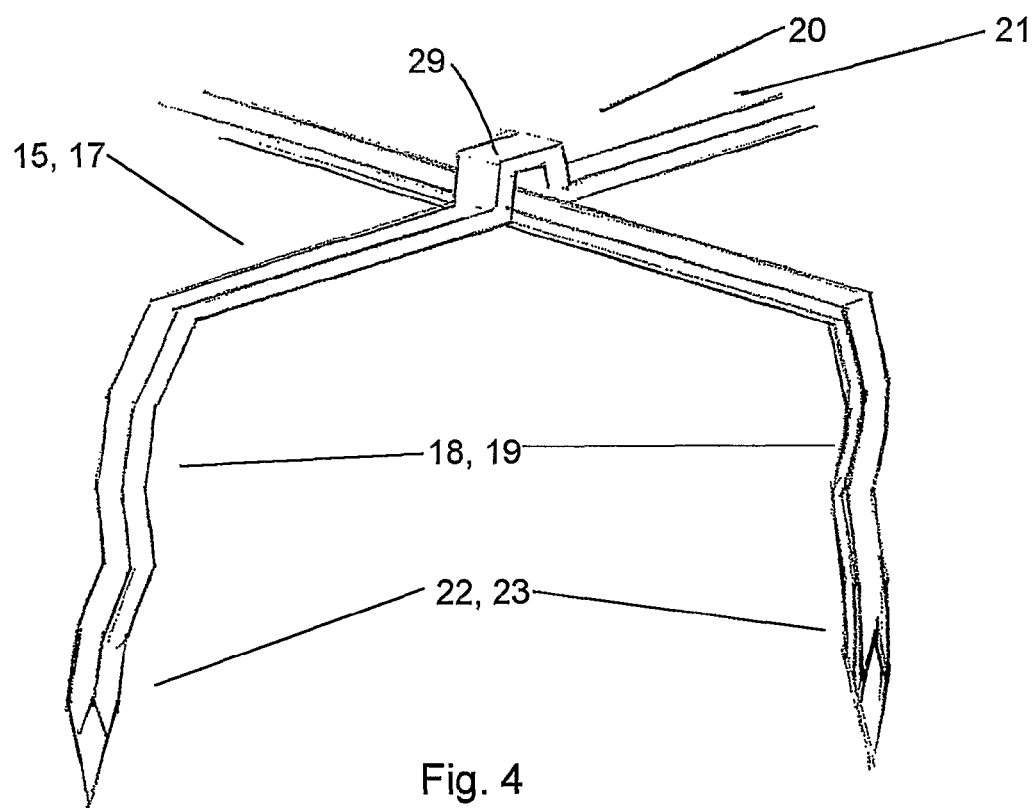
FIG. 4 is a diagrammatic pictorial view of two connectors of FIGS. 1 and 2 in use across one another, with a slight variation on one of the connectors.
Figure 8A:
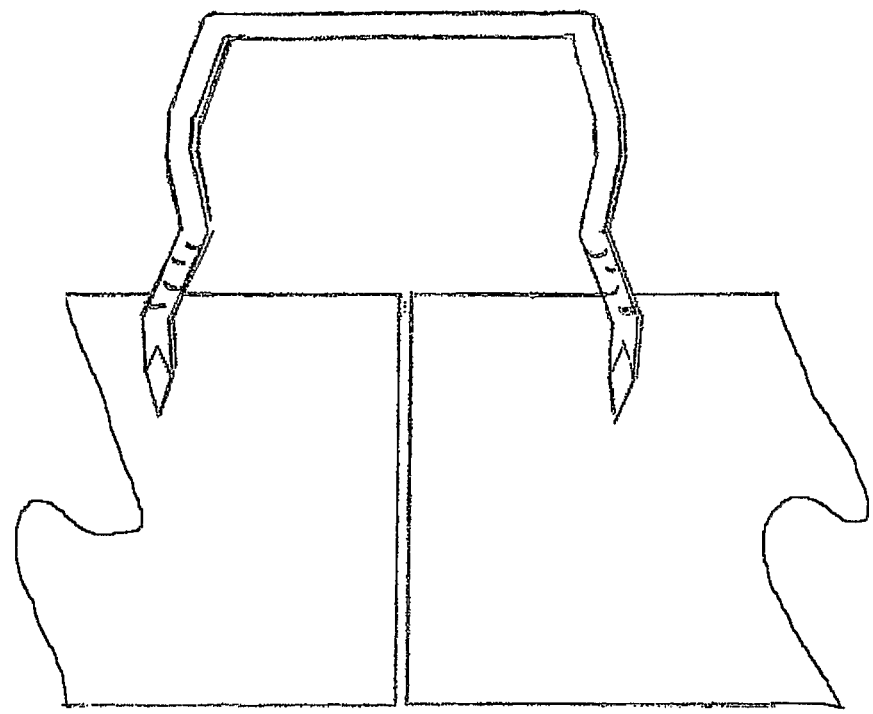
FIG. 8 is a sequence of schematic views (FIGS. 8a, 8b, 8c and 8d) showing the tensioning of timber elements connected by one of the connector of the FIGS. 1 and 2.
Figure 8B:
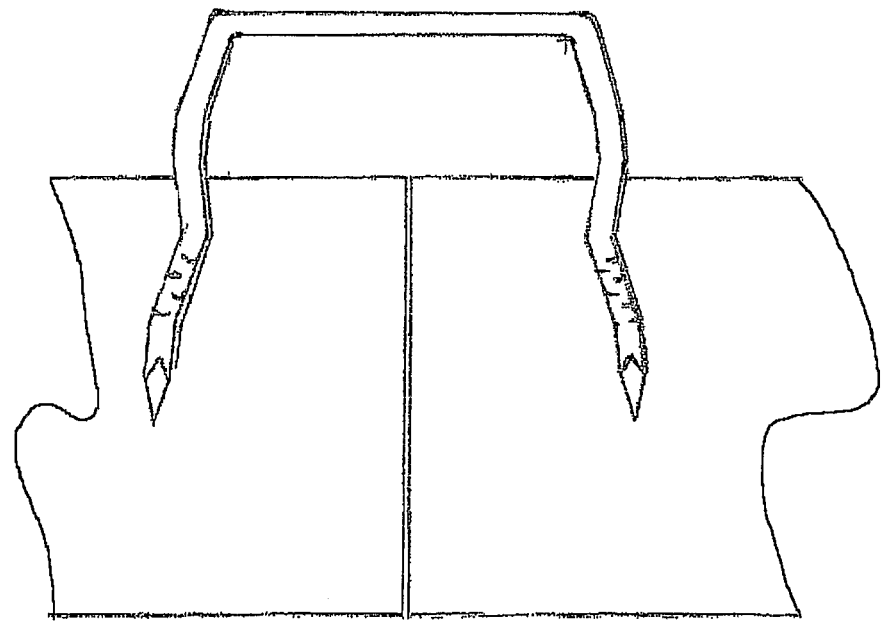
Figure 8C:
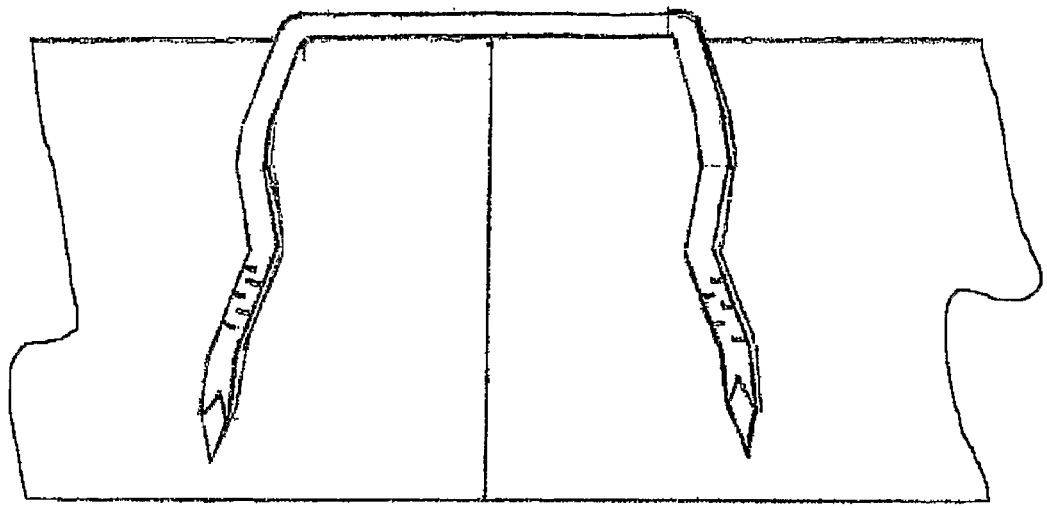
Figure 8D:
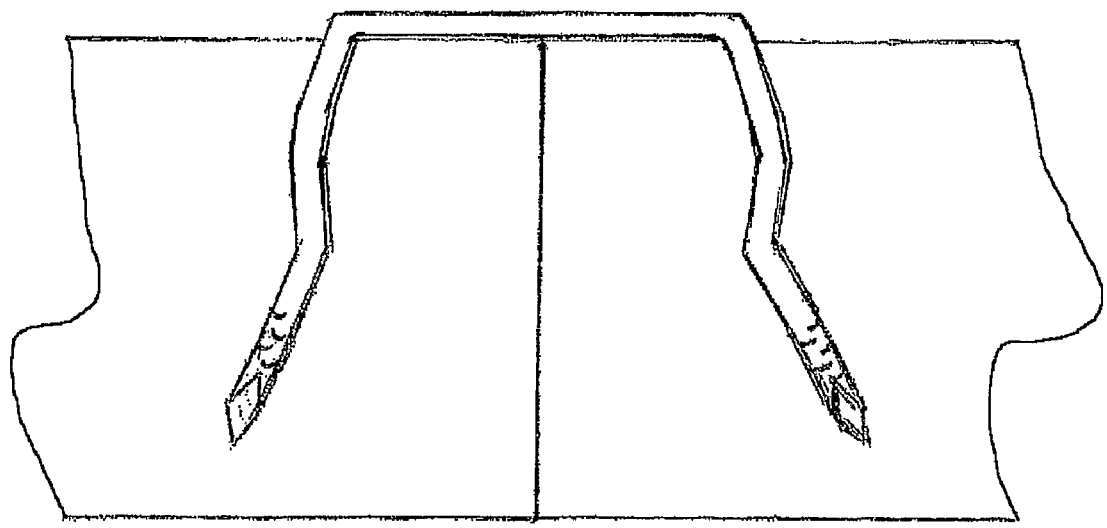

Two connectors may be inserted crossways with respect to one another as shown in FIG. 4. The stem portion of one of the connectors may include a bridge portion 29 interposed between its ends to permit the majority of the stem portion to lie against (or slightly embedded into the face of) the timber being connected.

The spike portion is shown in FIG. 6 with the cranked portions detailed. In FIG. 7, it can be seen that the connector of the present invention can have some variation in the angle of the spikes to one another by torsional twisting of the stem portion as shown. Such torsional variation can result in the spike axes up to 10 to 15° from having one another.

As the connector is inserted as shown in the four stages depicted diagrammatically in FIGS. 8a, 8b, 8c and 8d, spaced apart timbers are drawn together as the connector is inserted therein. It will be appreciated normally, timbers to be connected are arranged in abutting relationship, whereby insertion of the connector in accordance with the invention affords that a compressive force be exerted between the spike entry points in the timbers manifested by a compressive force applied to the abutting faces of the connected timbers.

Figure 9:
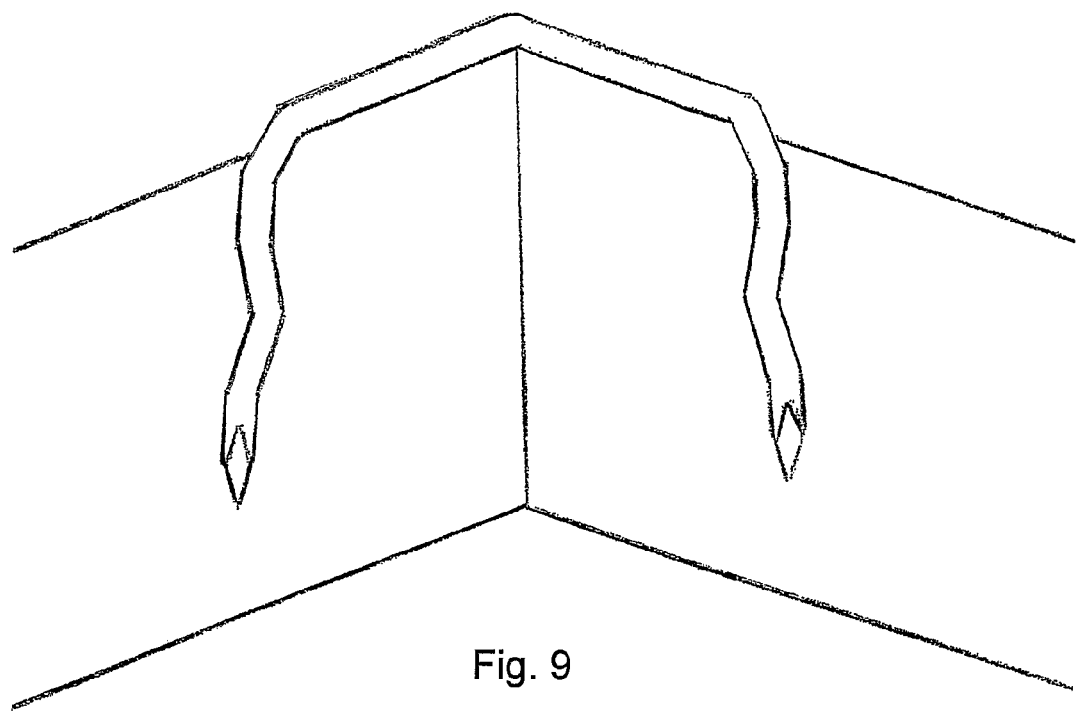
FIG. 9 is a diagrammatic pictorial view showing the insertion of a ridge staple according to the invention into the top face of the ridge of a roof truss.
Figure 10:
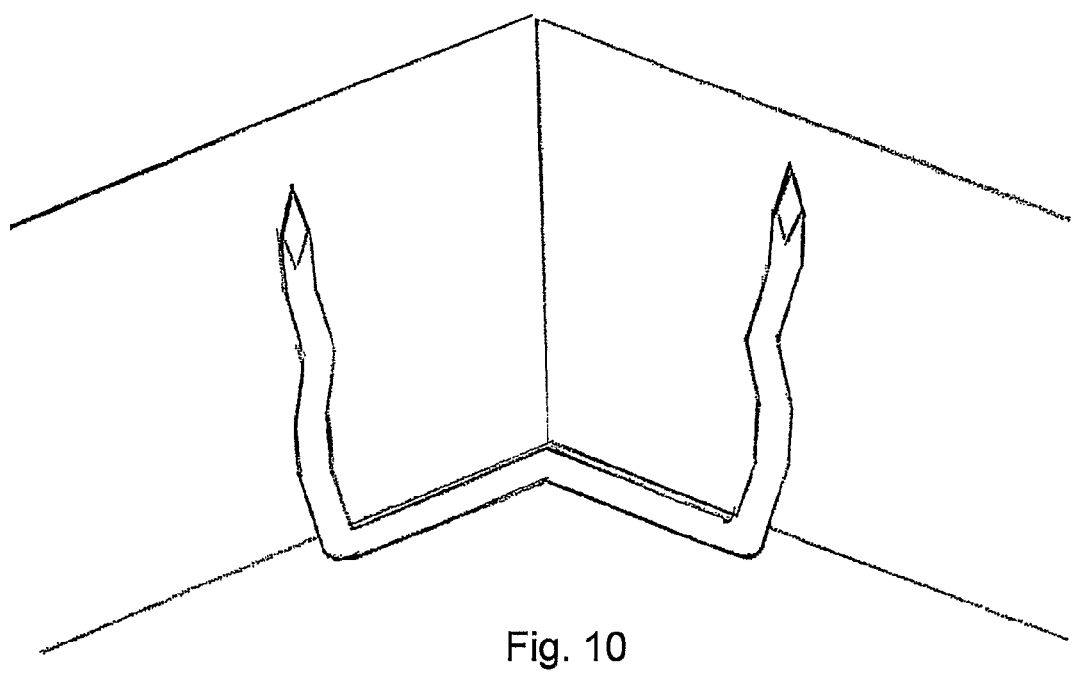
FIG. 10 is a diagrammatic sectional view showing the insertion of a top apex staple according to the invention into the underside of the apex of a roof truss.
Figure 11:
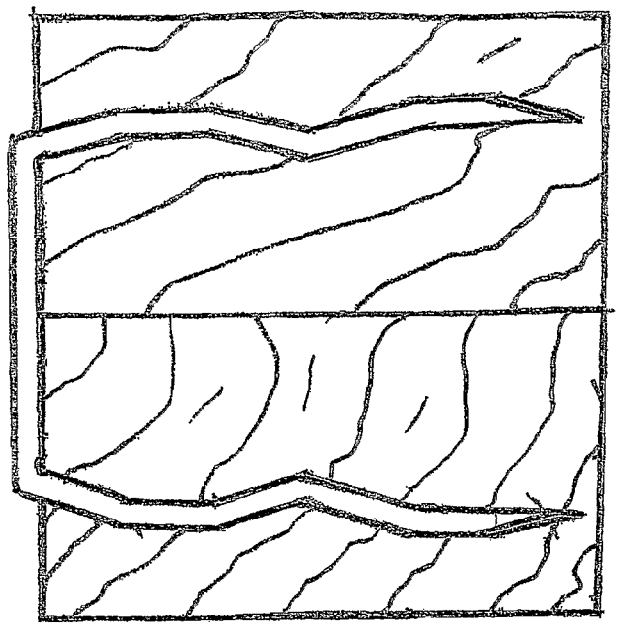
FIGS. 11 and 12 are diagrammatic side sectional views of the connector connecting a plate to a ribbon and a plate to a stud respectively.
Figure 12:
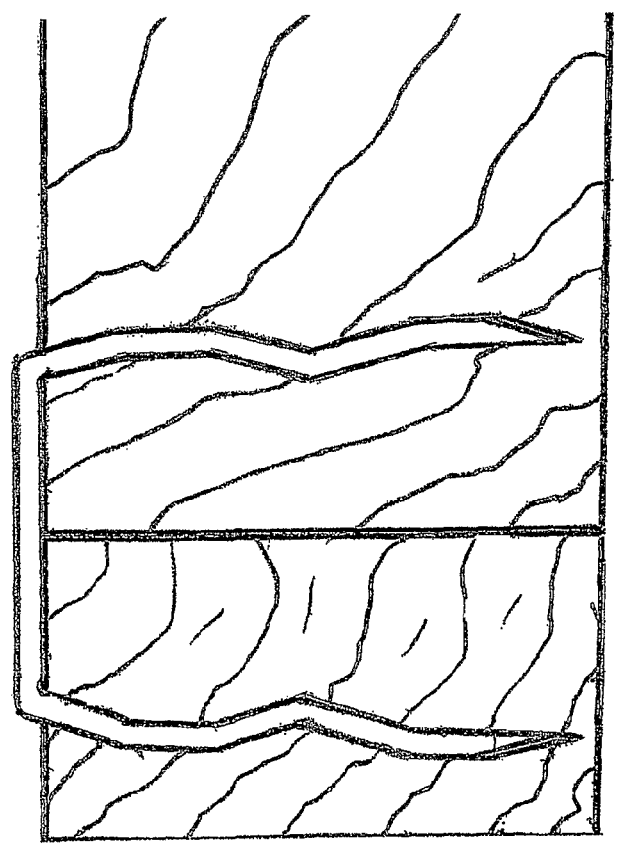

In FIGS. 9 and 10, the stem of the connector is provided with a sharp bend intermediate its ends in substantial conformity with the angle of the ridge of a roof truss. The angle between the stem adjacent or where it adjoins the respective spikes is adjusted to compensate for the angle of the stem bend. In such form, the angles of the spikes to the axis extending between the ends of the stem portion are the same as if the stem portion were straight.

In use, a connector of the present invention may be used for connecting two or more timber elements to one another. Generally speaking, the more common usage of the connector of the invention is where the stem portion will be substantially straight and, when the connector is inserted into the timber elements, the stem portion would substantially lie against the aligned faces of the connected timber elements. It is envisaged that the connector would be normally inserted by using a percussive instrument such as a staple gun or the like in which case both spike portions of the connector would be inserted into the timber elements at substantially the same time. However, where a hammer is used, the bend between the spike portion and stem portion on each end may be struck with the hammer using one or more blows to each end in succession before striking the other end. However, in either case, it is believed that the course of each spike portion followed into the timber is affected by the skew portions to direct the path of the sharpened tip or end portion through the timber which is followed by the remainder of the spike to provide a tensioning of the stem portion and a corresponding tightening of the connection between the timber elements. The timbers being connected have their joint tightened by the insertion of the connector of the present invention. The tightening corresponds, for example, to a resilient "spreading" of the spikes outward from, say, 10° to, say, 20° when inserted into the timbers.

The connector of the present invention may be formed as a one-piece tension staple of spring wire or rod formed to a desired shape. A spike is formed at either end of the crown portion whereas the knuckle formed over the centre of the spike length. The formed knuckle helps to alleviate the pull-out problem when extreme load is applied by cyclone of earthquake conditions. After testing earlier designs and not being able to achieve the desired result due to the designs themselves, which was splitting timber and over-tensioning the staple, the original design was added to. The inventor believes that there are two aims, firstly to alleviate timber splitting of softwood and secondly to maximize hold-on strength or pull-out resistance, whilst still retaining flexibility during cyclone load. It is believed that it is either essential or at least very important that these aims can be achieved by having the shoulder and shoulder length at an angle to the crown and the upper shank portion length shorter than the shoulder portion to the crown. This is believed to provide a greater flexibility, easier tension on application and longer duration when tested under cyclonic conditions. Therefore the flexibility from the upper knuckle portion to the shoulder to the crown is important to alleviate timber fracture and tension enough as timbers are held secure under extreme wind load. As the staple spikes are penetrating the timber they tension off each other and flex in an outward motion once in the timber. The spike knuckle bends in the timber and reduces the pull-out propensity, particularly when subjected to cyclone conditions. Destructive testing analysis has revealed that the timber gives way before the connector is removed.

In such form, the shoulder length and the upper shank portion allow the knuckle and lower shank portions to spread outward when the spike tip penetrates the timber member. When the spike is driven in fully the knuckle bends into the timber and the angle at the upper knuckle portion, upper shank and shoulder become flexible under extreme load. During the application of the staple, the flexibility is sufficient to provide a compressive force to the abutting faces of the timbers being joined, yet not over-tensioning which would cause the timber to be more prone to splitting. During tensioning, the outer bevel at the spike tip guides the spike direction as to track in a straight line to tension the spikes up to 10° greater than the first starting position. Under extreme force cyclone simulation test, the lower shank portions were found to move in an outward motion as to increase the pull-out resistance.

Figure 13:
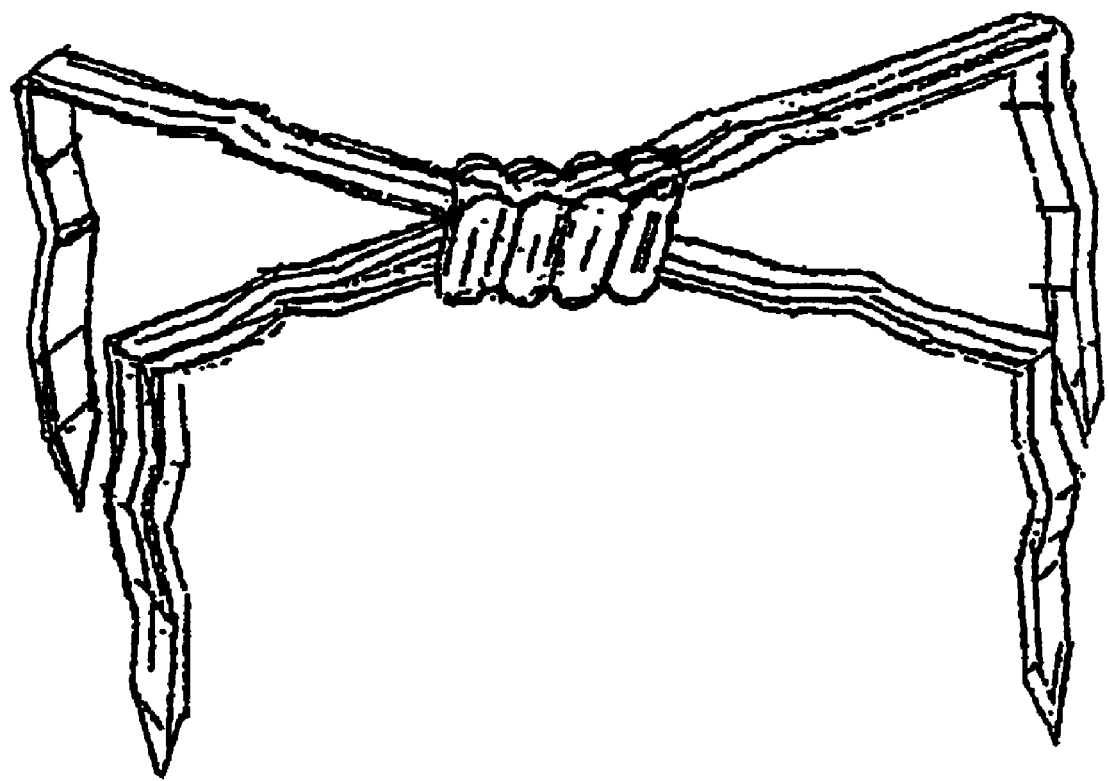
FIG. 13 is a diagrammatic view of two connectors joined at their stem portions such that the stems are aligned generally in the same direction.

FIG. 13 is a diagrammatic view of two connectors joined at their stem portions such that the stems are aligned generally in the same direction.

Although the invention has been described with reference to specific examples, it will be appreciated by persons skilled in the art that the invention may be embodied in other forms which are encompassed within the broad scope and ambit of the invention as herein-set forth.

The invention claimed is:

1. A connector for connecting together abutting or adjoining timber elements, including:
   a stem portion extending between two spike portions, each spike portion extending from a respective end of the stem portion generally in a common direction from the stem portion to form a generally u-shaped connector such that the stem portion has a stem axis extending straight between each end, each spike having four substantially straight portions of approximately equal length extending from one another end-to-end as follows:
   an inner portion adjoining the stem portion and extending from each end thereof at an inside angle in the range of 95° to 100° to the axis of the stem portion;
   a proximal skew portion adjoining and extending from the inner portion at an inside angle in the range of 36° to 65° to the axis of the stem portion;
   a distal skew portion adjoining and extending from the proximal skew portion at an inside angle of 115° to 142° to the axis of the stem portion; and
   a tip portion adjoining and extending from the distal skew portion at an inside angle substantially at 90° to the axis of the stem portion,
   such that the axes of each portion lie substantially in one plane and the axes of the tip portions intersect the axis of the stem portion remote from the ends of the stem portion, the distal end of tip portion being sharpened.

2. The connector according to claim 1, wherein the inner, proximal, distal and tip portions of each spike are disposed at substantially the same angles to the stem axis as one another, one spike defining a mirror image of the other.

3. The connector according to claim 2, wherein said connector is integrated with another said connector by joining two or more stem portions together intermediate their-respective ends such that the stems are aligned generally in the same direction.

4. The connector according to claim 1, wherein the stem portion is substantially straight.

5. The connector according to claim 4, wherein said connector is integrated with another said connector by joining two or more stem portions together intermediate their respective ends such that the stems are aligned generally in the same direction.

6. The connector according to claim 1, wherein the stem portion is configured to conform substantially to the faces of the timber against which the stem portion would lie when the spikes have been substantially fully inserted into the respective timber elements.

7. The connector according to claim 6, wherein said connector is integrated with another said connector by joining two or more stem portions together intermediate their respective ends such that the stems are aligned generally in the same direction.

8. The connector according to claim 1, wherein said connector is integrated with another said connector by joining two or more stem portions together intermediate their respective ends such that the stems are aligned generally in the same direction.

9. The connector according to claim 8, wherein the portions of each spike of each said connector are aligned to occupy substantially parallel planes.

10. The connector according to claim 1, wherein the stems of said connector is entwined with a stem of another said connector.

11. The connector according to claim 1, wherein the portions of each spike and the stem of a first and second said connector are aligned to occupy a single plane.

12. A method of connecting timbers including:
   A. providing a connector for connecting together abutting or adjoining timber elements, the connector having a stem portion extending between two spike portions, each spike portion extending from a respective end of the stem portion generally in a common direction from the stem portion to form a generally U-shaped connector such that the stem portion has a stem axis extending straight between each end, each spike having four substantially straight portions of approximately equal length extending from one another end-to-end comprising:
      (1) firstly an inner portion adjoining the stem portion and extending from each end thereof at an inner inside angle in the range of 95° to 100° to the axis of the stem portion,
      (2) secondly a proximal skew portion adjoining and extending from the inner portion at a proximal skew portion angle in the range of 36° to 65° to the axis of the stem portion;
      (3) thirdly a distal skew portion adjoining and extending from the proximal skew portion at distal skew portion angle in the range of 115° to 142° to the axis of the stem portion and fourthly a tip portion adjoining and extending from the distal skew portion at tip angle substantially at 90° to the axis of the stem portion,
   the distal end of tip portion being sharpened and the axes of each portion of the spikes lying substantially in one plane and the angles being selected such that axes of the tip portions intersect the axis of the stem portion remote from the ends of the stem portion, and
   B. inserting the connector into timber thereby causing flexing of the spikes with respect to the stem to a degree sufficient to impart tension to the stem.

\* \* \* \* \*